United States Patent [19]
Kandler

[11] 3,930,883

[45] Jan. 6, 1976

[54] ZINC-CONTAINING ELECTRODE

[75] Inventor: Ludwig Kandler, Munich-Solln, Germany

[73] Assignee: Rheinisch-Westfalisches Elektrizitalswerk Aktiengesellschaft, Essen, Germany

[22] Filed: Feb. 27, 1974

[21] Appl. No.: 446,514

Related U.S. Application Data

[60] Continuation of Ser. No. 185,836, Jan. 10, 1971, abandoned, which is a division of Ser. No. 64,419, Aug. 17, 1970, abandoned.

[30] Foreign Application Priority Data

Aug. 16, 1969 Germany............................ 1941722

[52] U.S. Cl. .................. 136/31; 136/76; 204/35 N; 204/40
[51] Int. Cl.² ......................................... H01M 35/30
[58] Field of Search ........... 136/30, 125, 31, 76, 20, 136/126; 204/292, 55 R, 96, 100, 204/40, 43 Z, 35

[56] References Cited
UNITED STATES PATENTS

| | | |
|---|---|---|
| 3,272,653 | 9/1966 | Solomon et al................... 136/30 X |
| 3,427,203 | 2/1969 | Fletcher.......................... 136/125 X |
| 3,516,862 | 6/1970 | Van der Grinten................... 136/30 |
| 3,607,409 | 9/1971 | Hamlen........................... 136/30 |
| 3,671,319 | 6/1972 | Arrance.......................... 136/30 |
| 3,816,178 | 6/1974 | Maki et al.......................... 136/30 |

*Primary Examiner*—John H. Mack
*Assistant Examiner*—C. F. Lefevour
*Attorney, Agent, or Firm*—Karl F. Ross; Herbert Dubno

[57] ABSTRACT

A zinc negative electrode for alkaline accumulators and method of making same. The zinc and/or zinc compounds are electrochemically deposited upon a current-collection grid in the presence of substances forming low-solubility zincates upon the discharge of the plate. Preferably the substances include calcium and magnesium compounds forming the corresponding zincates substantially immediately upon solubilization of the zinc in the alkaline electrolyte.

2 Claims, 2 Drawing Figures

ZINC-CONTAINING ELECTRODE

This is a continuation of application Ser. No. 185,836, filed 1 Oct. 1971, now abandoned, which is in turn a Division of Ser. No. 64,419, 08/17/70, also now abandoned.

The present invention relates to a method of making zinc-containing electrodes and, more particularly, to a method of making a zinc-containing negative electrode for use in alkaline storage cells or batteries and, preferably, as counterelectrodes to silver/silver oxide and nickel/nickel oxide electrodes in such batteries.

The use of zinc as in electrochemically active substance as in electrode material in alkaline, acid or neutral electrolytes has been widespread over the years because of the high reactivity and electronegativity of zinc in substantially all environments. Problems such as the autosolubilization of zinc metal, which have frequently concerned the art, have in part been solved by amalgamation of the zinc.

When, however, zinc-containing electrodes are to constitute the negative electrode of an alkaline accumulator, storage cell or battery, however, a host of special problems are encountered. Firstly, metallic zinc and its alloys are readily soluble in the alkaline electrolyte and, consequently, the discharge/charge cycle corresponds to a solubilization of zinc in the electrolyte and the formation of zincate ions, and the redeposition of zinc upon the electrode from the solution respectively. The replating or redeposition of zinc occurs in the form of treed or branched crystals having sharp points (dendrites) which readily bridge the gap between the plates of opposite polarity, thereby causing short circuits and the destruction of the cell. Where dendrite formation is not a problem because of the wide spacing of the plates, the cell has a low power-to-volume or power-to-weight ratio. It has been proposed to provide wrappings or the like of cellophane about the zinc electrode, the cellophane constituting a semipermeable membrane separation between opposite-polarity plates, but this expedient has reduced the number of charge/discharge cycles which the cell is able to tolerate and has also reduced power output, discharge rate and charging rate. Another problem frequently encountered in connection with zinc negative electrodes is that of "shape change" since the redeposition of zinc-containing material from solution does not generally occur uniformly over the entire surface of the plate.

It is, therefore, the principal object of the present invention to provide a negative zinc-containing plate for alkaline accumulators (i.e. alkaline storage batteries or cells) which permits an increased number of charge/discharge cycles and yet restricts dendrite formation and the tendency to form short-circuit bridges between the opposite-polarity plates or electrodes.

Another object of this invention is to provide an improved storage cell or battery with elevated cycle life, reduced tendency to breakdown by short-circuit, and freedom from the other problems hitherto with dendrite growth in zinc-containing alkaline cells.

It is also an object of the invention to provide an improved method of making such an electrode.

These objects and others which will become apparent hereinafter, are attained, in accordance with the present invention, with a negative electrode for alkaline accumulators in which the active mass (i.e. the mass participating in a principal electrochemical reaction at the electrode) comprises zinc or a zinc compound and is present in association with at least one substance capable of forming corresponding zincates of low solubility in the electrolyte during discharge of the plate. The substance, which is capable of forming the low solubility zincates, according to this invention, is preferably an alkaline-earth-metal hydroxide with the compound formed being the corresponding low solubility alkaline-earth-metal zincate. Of particular suitability, in this connection, is calcium hydroxide although magnesium hydroxide may also be used. In the first case, the product is calcium sincate while in the second case it is magnesium sincate. Surprisingly, the alkaline-earth zincates resulting from the substantially instantaneous reaction of the alkaline-earth hydroxide and the solubilizing zinc during discharge, does not irreversibly remove the reacted zinc from the system in terms of the active mass; moreover, it has been found that the zinc redeposits or replates from the low solubility zincate, in the form of a porous spongy mass. While it is doubtful that the spongy porous mass is formed directly from the precipitated alkaline-earth zincate, this hypothesis cannot be excluded although it is assumed that the small quantity of this low-solubility compound which is in the solution, is readily depleted by electrodeposition and galvanic techniques and is replenished from the low-solubility salt which is precipitated from the solution.

According to the principles of the present invention, therefore, the zinc or zinc compounds incorporated in the negative electrode plate for an alkaline accumulator are mixed with an auxiliary substance tending to form low-solubility salts with the zinc as it goes into solution during discharge of the cell, i.e. low-solubility zincate salts. From the low-solubility compounds thus formed, sponge zinc precipitates on the plate during charging of the cell without dendrite formation.

According to a further feature of this invention, a negative electrode plate containing zinc as an electrochemically active metal, comprises an inner conductive grid or current distributor collector, e.g. a metal foil or wire mesh, which is imbedded on all sides in a mixture of zinc or a zinc compound and the auxiliary substance capable of forming low-solubility zinc salts, the mass being packed around the conductive support. In this construction, the supply of electric current to the plate as well as the withdrawal of electric current therefrom takes place at the center of the plate, i.e. in the immediate vicinity of the conductive grid or support, whereby the conversion of metallic zinc to low-solubility zinc compounds during discharge is effected from the center outwardly in a progressive fashion. The reduction of the zinc compounds during charging of the cell, conversely, takes place from the interior outwardly as a result of the low conductivity of the slightly soluble compounds.

It has been found to be advantageous to provide the electrochemically active mass (i.e. zinc or zinc compounds) in a porous form and, in addition, to provide means for preventing the mixture from sloughing or breaking away from the plate. The latter means, according to the invention, may include a porous synthetic-resin layer surrounding the porous mass which, in turn, surrounds the conductive support on all sides. The porous synthetic-resin layer may be a fabric (woven) or a fleece, or felt mat of filaments (nonwoven) and it is an important aspect of this invention that the pores of this synthetic resin layer or sheet are at least partly filled with the auxiliary substance, i.e. an alkaline-earth metal hydroxide and especially calcium hydroxide. Best results are obtained when the supporting wrapping of synthetic-resin layers is carried by the conductive support, e.g. via spacers which define the thickness of the deposit of the active mass packed around this support.

The invention also relates to an improved method of making the electrode. In accordance with these aspects of the invention, the zinc or zinc compounds and the auxiliary substances are electrochemically deposited upon the conductive support from an electrolyte. The electrolyte contains, in addition to zinc ions and ions of the auxiliary substance designed to provide low-solubility synthetic salts, ions of a substance which is reduced by hydrogen-ion consumption. When the metallic grid or support is subjected to a cathodic polarization in this electrolyte, the resulting precipitate consists of spongy metallic zinc, zinc hydroxide and calcium hydroxide in a porous mass. It is indeed unusual that both the metallic zinc and the zinc hydroxide are deposited simultaneously and, in view of the fact that the low solubility zincate salt is formed during discharge of the plate, that all three of the components (zinc, zinc hydroxide and calcium hydroxide) are electrodeposited simultaneously. The consumption of hydrogen ions in the reduction of the further ions mentioned earlier permits a shift in the pH value during the process, apparently thereby yielding zinc hydroxide and calcium hydroxide. Best results are obtained when nitrate ions are present in the electrolyte as consumers of hydrogen ion.

According to still another feature of this invention, the zinc and/or zinc compounds and the auxilieary substance capable of forming low-solubility zincates, are deposited from solution by electrodeposition or electrolysis techniques. The process may be carried out by substitution of electrolytes so that, for example, the concentration of zinc ion, calcium ion and nitrate ion and the ratios of one to the others can be varied freely. The system allows numerous variations which will be readily apparent, since the alkaline-earth-metal hydroxide can be deposited exclusively or in combination with zinc and/or zinc hydroxide in accordance with the principles of the invention. Consequently, it is advantageous to initially constitute the electrolyte such that a preponderance of zinc and/or zinc hydroxide or an excess over the calcium hydroxide is deposited in a first stage from one electrolyte, while equimolar quantities of calcium hydroxide and zinc and/or zinc hydroxide are deposited in the next stage. The last layer can, of course, be calcium hydroxide exclusively so that a sheath thereof is provided as a protective layer for the electrode, the sheath preventing undesirable reactions between the active materials and the other materials of the system.

Of course, it is also possible to prepare the electrode of the present invention by mechanically mixing zinc or zinc compounds with the alkaline-earth-metal compounds and to form a paste from the mixture which is applied to the support; alternatively, the support may be imbedded in the paste so that in either case the support or grid is fully surrounded by the active material. This system may, however, be combined with the system previously described so that, for example, a pasted plate may be coated with zinc and/or zinc hydroxide and/or calcium hydroxide by electrodepositing methods as set forth earlier, or an electrodeposited mass of zinc and/or zinc hydroxide and/or calcium hydroxide may be coated with a paste of zinc and/or zinc compounds and/or calcium hydroxide. Best results are obtained when the final (outermost) layer is a layer of electrodeposited calcium hydroxide. The electrode may be wrapped in a porous synthetic-resin layer as noted above, the pores of this layer being at least in part filled with an auxiliary substance as mentioned earlier. It has been discovered that deposition of the auxiliary substances in the pores ccan be conveniently carried out by initially immersing the synthetic-resin layer in a solution of alkaline-earth-metal ions and thereafter dipping the impregnated layer into an alkaline solution (e.g. aqueous sodium or potassium hydroxide). As a result, the corresponding alkaline-earth-metal hydroxide will be formed in the wrapping layer. Moreover, the process may be repeated several times to obtain the desired concentration of the alkaline-earth-metal hydroxide in the wrap.

According to another feature of this invention, following the preparation of the electrode as described above, the electrode which may have variation concentrations of zinc, zinc hydroxide, before or after application of the wrap, and alkaline-earth-metal hydroxide, is subjected to cathodic reformation in an alkaline electrolyte to convert substantially all of the zinc hydroxide to finely divided metallic zinc in uniform and intimate contact with the calcium hydroxide. Upon charging and discharging of the electrode, dendrite formation is excluded while other parameters of the electrode are not substantially changed.

The above and other objects, features and advantages of the present invention will become more readily apparent hereinafter, reference being made to the accompanying drawing in which.

Figure 2:
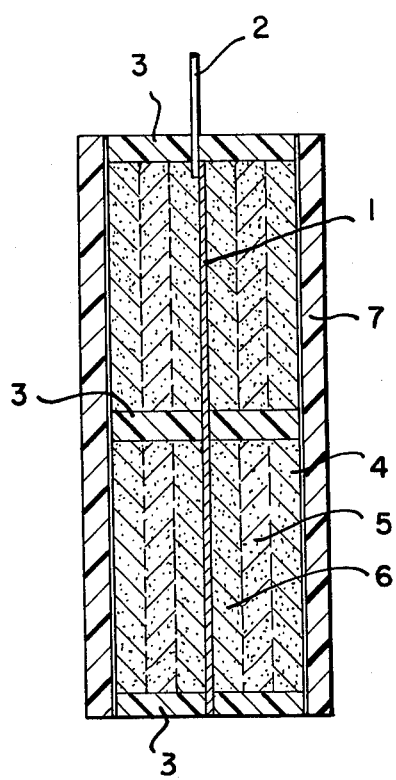
FIG. 2 is an electrode as made by the process.

The electrode shown in FIG. 2 comprises a metallic support 1 in the form of a wire grid of zinc-plated copper to which a terminal tab 2 is spot-welded. On the edges and in the middle of the support 1, there are provided on both sides of the support, spacers 3 in the form of plexiglass rods or ribs, held in place by cement. The space within the outlines of the plate and flush with the rods 3 is filled with the active material in three layers 4, 5, 6. The inner layer 4 is a zinc-enriched layer in which the zinc molar concentration exceeds the calcium molar fraction while the second layer 5 is calcium hydroxide rich in the sense that the molar concentration of zinc or zinc compounds. The layer 6 consists exclusively of calcium hydroxide and the plate is surrounded by a layer 7, wrapped therearound, consisting of porous synthetic resin, e.g. a nonwoven fabric of hylon filament, impregnated with calcium hydroxide.

Figure 1:
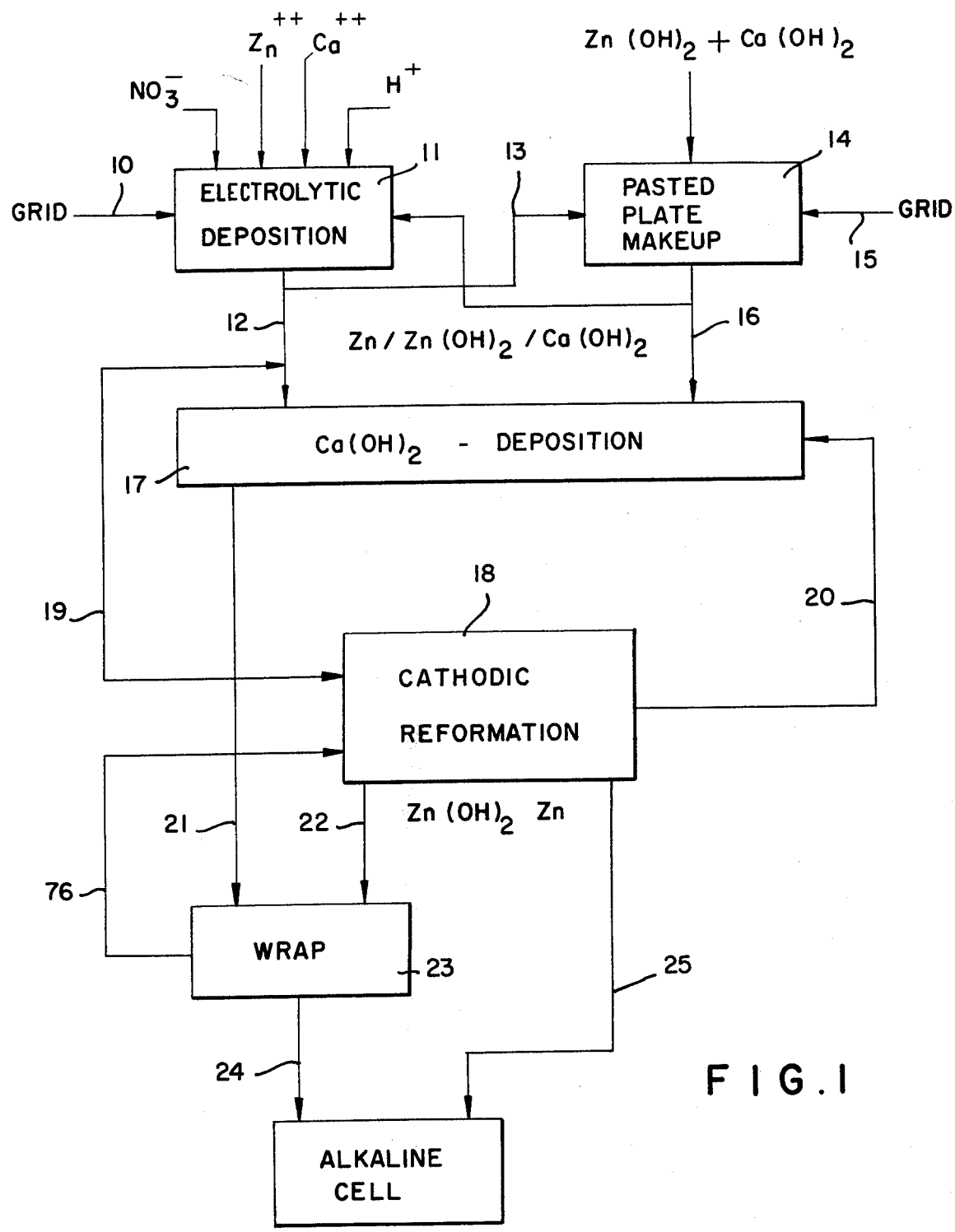
FIG. 1 is a flow diagram illustrating the invention.

In FIG. 1, there is represented the several stages of the present process in flow-diagram form. A grid 10 may be supplied to an electrolytic deposition stage 11, the electrolyte containing nitrate ion, zinc ion, calcium ion and hydrogen ion, to produce a plate at 12 in which the active material consists of zinc, zinc hydroxide and calcium hydroxide. Where desired, this plate may be provided as shown at 13 and 14 with a pasted layer of zinc, oxide or hydroxide and/or calcium oxide or hydroxide. Alternatively, the grid may be supplied at 15 to station 14 at which a zinc hydroxide/zinc oxide and calcium hydroxide/calcium oxide plate is prepared. The plates obtained at 12 and 16 may be led to a further station 17 at which calcium hydroxide is electrodeposited thereon as the outer sheath, the resulting plate being subjected to cathodic reformation at 18 to convert the zinc hydroxide to finely divided metallic zinc. Alternatively, the plate 12 may be led at 19 to the cathodic reformation stage and only thereafter will the outer layer calcium hydroxide be applied as shown at 20. The resulting plates, with or without a final cathodic reformation as shown in 21 and 22 may be wrapped at 23 and introduced into an alkaline cell with nickel or silver counterelectrodes as shown in 24. The plate 25 obtained from the cathodic reformation stage may be similarly introduced directly into the cell. The wrapping may be followed by cathodic reformation as shown at 76.

EXAMPLE I

A zinc-plated wire mesh of rectangular configuration and having dimensions of 31 × 51 mm is provided with a metal tab by spot-welding and is formed with spacer ribs along the edges on both sides of the support. The spacers are composed of plexiglass and are cemented to the wire grid. The electrode thus prepared is immersed in an electrolyte containing 600 gr/liter of zinc chloride and 200 gr/liter of calcium nitrate in water, the bottom of the vessel being provided with a layer of zinc oxide. Using the electrode as a cathode against a zinc anode, electrolysis is carried out for two hours at a current of 0.5 amperes. Thereafter, the electrode is cathodically electrolyzed in an electrolyte containing 800 gr/liter of calcium nitrate over a period of one half hour with a current of 0.3 amperes. The electrode is then immersed in an aqueous potassium hydroxide solution (37%) and electrolyzed for 20 hours with a current of 0.1 amperes. In this last step, zinc compounds previously deposited are converted into metallic zinc. The electrode is then dipped, after rinsing in a mercury chloride solution to amalgamate the zinc. Under light pressure, a nonwoven synthetic-resin layer (Viledon) is wrapped around the electrode and cemented to the spacers. The electrode is then dipped in a calcium chloride solution and then again in a potassium hydroxide solution to precipitate calcium hydroxide in the pores of the wrap. The electrode 6 is then used in a storage battery in which nickel III oxide constituted the counterelectrode or in combination with an air electrode in a zinc/air battery. In each case, potassium hydroxide served as the electrolyte. The plate had a capacity of 1.4 ampere hours corresponding to 10.5 ampere hours/decimeter$^2$ of apparent surface. Repeated charge/discharge cycling showed no evidence of dendrite formation.

EXAMPLE II

Upon the grid prepared as in EXAMPLE I, a viscous paste was coated flush with the spacers, the paste consisting of equal parts by weight of zinc oxide and calcium hydroxide in the presence of sufficient water to impart a pasty consistency to the mass. After drying, a zincate resin layer of nonwoven fabric as described in Example I was supplied and the plate thereafter electrolyzed in an electrolyte containing 800 gr./liter of calcium nitrate as described in Example I. After a cathodic treatement in potassium hydroxide solution, the electrode was found to have a capacity of 1.1 ampere hours.

EXAMPLE III

Following the procedure outlined in Example II up to the provision of the synthetic-resin layer of nonwoven fabric, the electrode was cathodically electrolyzed in a solution containing 400 gr./liter of zinc chloride and 400 gr./liter of calcium nitrate for one half hour at a current of 0.5 amperes. The electrode was then processed in the calcium nitrate solution as described in Examples I and II. The electrode was subsequently cathodically treated in potassium hydroxide solution and was found to have a capacity of 1.6 ampere hours.

I claim:

1. A method of making a negative electrode for an alkaline accumulator, comprising the steps of:
   a. electrolytically depositing zinc and calcium upon a conductive support in the form of Zn, Zn(OH)$_2$ and Ca(OH)$_2$ from an electrolytic bath containing zinc ion, calcium ion and nitrate ion with the ratio of zinc ion to calcium ion made relatively high and establishing the proportions of zinc and calcium deposited on said support in a first electrochemically active layer directly upon said support;
   b. electrochemically depositing on said first electrochemically active layer an outer electrochemically active layer containing zinc and calcium as Zn, Zn(OH)$_2$ and Ca(OH)$_2$ from an electrolyte containing zinc ion, calcium ion and nitrate ion with the ratio of zinc ion to calcium ion made less than in step (a) whereby the outer layer has a smaller ratio of zinc to calcium; and
   c. forming said layers by electrolyzing same to transform the deposited zinc ion of said layers into elemental zinc.

2. The method defined in claim 1, further comprising the steps of amalgamating the metallic zinc, applying to said outer layer a coating of a calcium-containing substance free from zinc, and wrapping the electrode in a porous synthetic-resin material impregnated with calcium hydroxide.

* * * * *